United States Patent [19]

Kirtley, Jr.

[11] 4,233,548
[45] Nov. 11, 1980

[54] VARIABLE SPEED ELECTRONIC MOTOR

[75] Inventor: James L. Kirtley, Jr., Brookline, Mass.

[73] Assignee: Massachusetts Institute of Technology, Cambridge, Mass.

[21] Appl. No.: 898,264

[22] Filed: Apr. 20, 1978

[51] Int. Cl.³ .................. H02K 29/02; H02P 5/16
[52] U.S. Cl. .................. 318/138; 318/254; 318/767; 318/812
[58] Field of Search .............. 318/696, 138, 254, 301, 318/339–346, 439, 495, 496, 503–507, 738, 767, 812, 813, 720, 722, 724

[56] References Cited

U.S. PATENT DOCUMENTS

| | | | |
|---|---|---|---|
| 3,619,746 | 11/1971 | Thornton et al. | 318/138 |
| 3,628,110 | 12/1971 | Casaday | 318/138 |
| 3,831,072 | 8/1974 | Tanikoshi | 318/138 |
| 3,842,332 | 10/1974 | Heine et al. | 318/138 |
| 3,866,099 | 2/1975 | Boorbeau | 318/254 |
| 3,894,277 | 7/1975 | Tachibana et al. | 318/138 |
| 3,909,684 | 9/1975 | Smith, Jr. | 318/721 |
| 4,027,212 | 5/1977 | Studer | 318/254 |
| 4,047,081 | 9/1977 | Liska | 318/696 |
| 4,071,900 | 1/1978 | Jensen | 318/341 |
| 4,142,140 | 2/1979 | Wiesner | 318/138 |

OTHER PUBLICATIONS

S. M. Thesis, "An Improved Design of a S.G.R. Commutated AC Motor", (Donahoe), Jul. 29, 1977.

Primary Examiner—J. V. Truhe
Assistant Examiner—John W. Redman
Attorney, Agent, or Firm—Arthur A. Smith, Jr.

[57] ABSTRACT

A variable speed electronic motor which may be powered by an ac or dc source and wherein both the speed of the motor and the input power thereto are controlled and related to one another.

23 Claims, 14 Drawing Figures

VARIABLE SPEED ELECTRONIC MOTOR

The Government has rights in this invention pursuant to Contract N00014-78-C-0851, awarded by the Department of the Navy, Office of Navel Research.

The present invention relates to variable speed electronic motors and the like.

Attention is called to U.S. Pat. Nos. 3,909,684 (Smith, Jr.) and 3,619,746 (Thornton) and to prior art cited in each of the patents. See, also, a Master's thesis entitled "An Improved Design of A SCR Commutated AC Motor" (Donahoe), deposited in the M.I.T. library system on June 29, 1977.

The combination of fast-movng semiconductor technology with that of the older rotating electric machines, to provide a package that uses the semiconductor technology to advantage, goes on. The present invention presents a new way of providing a set of signals to control switching semiconducting elements which, in turn, control currents in the armatures of electric machinery. The use of this control scheme makes possible several different types of variable speed motor, operating from a variety of power supplies.

Accordingly, it is an object of the present invention to provide a variable speed electronic motor which may be ac powered, single or polyphase, or dc powered.

This and still further objects are addressed hereinafter.

The objects of the invention are achieved, generally, in a variable speed electronic motor for connection to a power source, which motor includes a rotor, an armature winding and semiconductor switching means to connect between the power source and the armature winding. The semiconducting switching means consists of semiconductor switches connected in pairs, one semiconductor switch of each pair being operable to carry current to the armature winding and the other semiconductor switch of each pair being operable to carry current from the armature winding. A position control module provides a position control signal; and a voltage control module provides a voltage control signal. A controlling is connected to control the semiconducting switching means. The controller includes a gating module connected to control each semiconductor switch of each pair; the gating module has signal transfer means to transfer control information to the associated semiconductor switch and a logic gate. The logic gate is connected to receive the position control signal and the voltage control signal and to combine the two signals to control the speed of the motor and the amount of electric energy transferred thereto.

The invention is hereinafter described with reference to the accompanying drawing in which.

Some general comments are contained in this paragraph. The present invention is directed to electronic motors such as, for example, the motor marked 101A in FIG. 1 which is powered from a three-phase power line and the motor marked 101B in FIG. 9 which is powered by a dc power source 103. (A machine powered from a single-phase power source can also be built using the present teaching.) In either case, the motor operates by producing a rotating current wave in the armature thereof; the armature is the same for both the motor 101A and the motor 101B and consists of a winding 2, comprising coils 3A–3F with respective nodes 4A–4F between coils, as shown. Differences between the motors 101A and 101B lie in the management of electric current to the motor nodes, but it will be seen that there is substantial similarity between the two. The principle difference is that the motor 101A is adapted to accept power from an ac source and uses thyristors as final power control elements, while the motor 101B is adapted to accept power from a dc source and uses transistors as final power control elements. In order to simplify the explanation, the motor 101A is described first.

Figure 1:
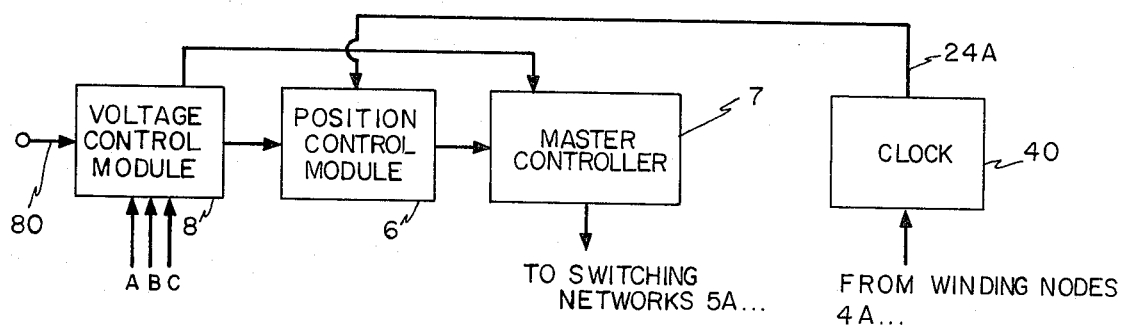
FIG. 1 is a schematic circuit diagram, partly block diagram in form, of an electronic motor of the present invention, that includes switching networks and a master controller.
Figure 1:
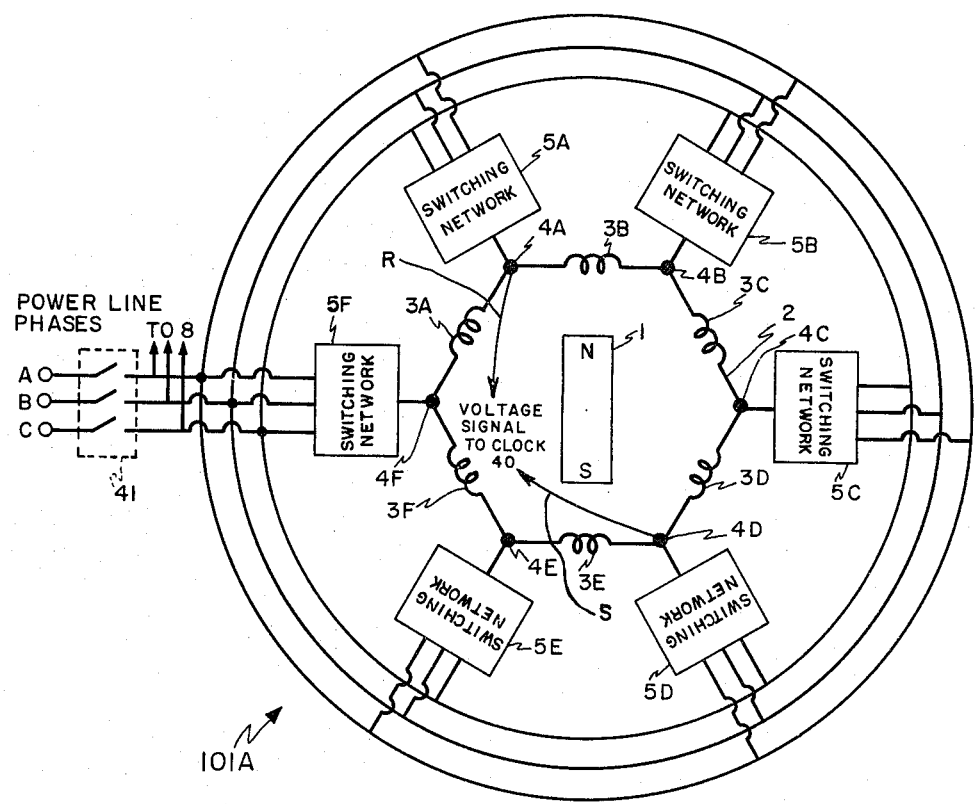
Figure 2:
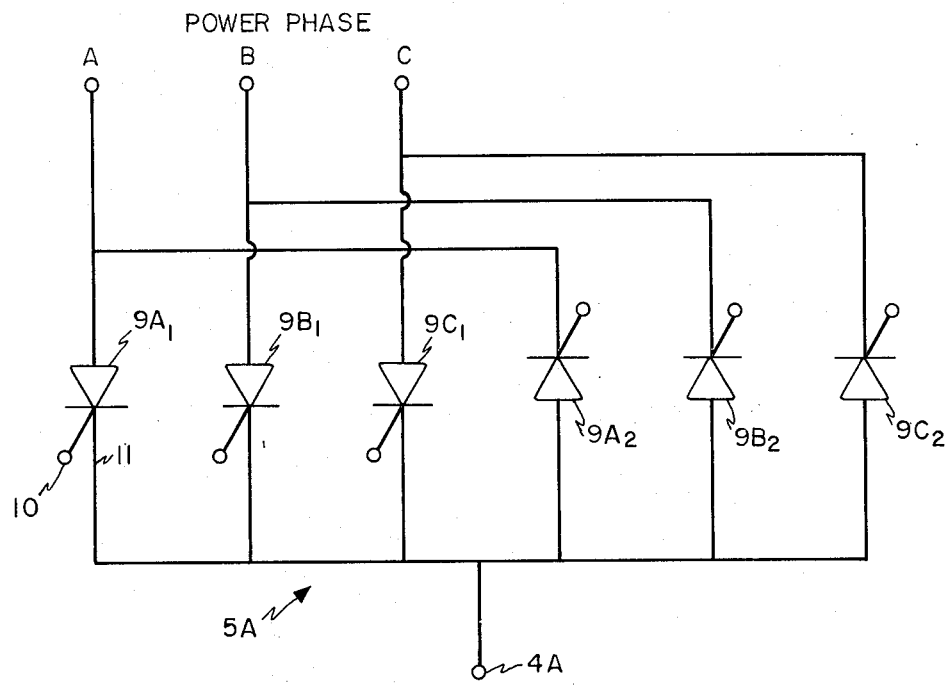
FIG. 2 is a schematic circuit diagram of one of the switching networks of FIG. 1 using thyristors as switches therein.

The motor 101A in FIG. 1 is a variable speed electronic motor for connection to a power source which may be a three-phase, ac power bus from a power company through a three-phase switch 41. The motor 101A has a rotor 1 (which may be a permanent magnet, a wound dc field (e.g., superconducting) or squirrel cage, for example) and the armature winding 2 comprising the plurality of coils 3A–3F connected in a polygon configuration with nodes 4A–4F between coils of the winding. Semiconductor switching means comprising switching networks 5A–5F is connected between the incoming power lines labeled A, B and C (or power source) in FIG. 1 and the winding 2, more particularly, between the power source and the nodes 4A–4F, respectively, and, hence, functions to monitor power flow to the nodes. Each of the networks 5A–5F (see, by way of illustration, the switching network 5A in FIG. 2)

comprises a plurality of semiconductor switches connected in pairs (see thyristor switch pairs $9A_1$–$9A_2$, $9B_1$–$9B_2$ and $9C_1$–$9C_2$ in FIG. 2), one semiconductor switch of each pair (e.g., the thyristor $9A_1$) being operable to carry current to the winding node associated with the particular switching network and the other semiconductor switch (e.g., the thyristor $9A_2$) of each pair being operable to carry current away from the associated winding node. It will be appreciated that there are as many semiconductor switching pairs in each switching network as there are phases in the incoming power line.

A position control module 6 provides a position control command signal as an input to a master controller 7. A voltage control module 8 provides a voltage control signal (the signal output from the module 8 may be a phase control pulse signal or, as later noted, may be a pulse-width modulated voltage control signal) as a further input to the master controller 7. It is shown below that these two signals serve as a basis for regulation of electric energy flow between the power source or power line and the armature winding. A signal from the position control module establishes the angular position in the machine 101 of the rotating electric field thereof and a signal from the voltage control module 8 establishes the intensity of that field.

The master controller 7 includes a gating module to control each semiconductor switch of each pair. One such gating module is shown at 102A in FIG. 3 for connection, for example, to control the thyristor $9A_1$ in FIG. 2; that is, the outputs shown at 12 and 13 of a pulse transformer 14 of the gating module 102A are connected between the gate labeled 10 and the cathode labeled 11 of the thyristor $9A_1$ in FIG. 2 to apply a gating pulse to the thyristor $9A_1$. The gating module 102A includes a signal transfer means or level shifter 32, consisting of the transformer 14, a transistor 15, a resistor 16 and a capacitor 17, and a logic gate 18 which, typically, is an AND-gate (but may be a NOR-gate, etc., i.e., a device that performs a multiplying function). When the gate 18 is an AND-gate and both the position signal input from the module 6 and the phase control signal from the module 8 are logical "1s", the logic gate 18 will conduct, biasing the transistor 15 ON and conducting a pulse $+V_{cc}$ through the transformer 14 to ground G, thereby gating the thyristor $9A_1$ ON. It is later shown that the logic gate 18 thereby regulates electric power flow to the winding node 4A (there is a logic gate connected to regulate electric power flow to each winding node) and hence to the armature winding 2. It is shown that the logic gate 18 also regulates the frequency applied to the winding 2 and, thus, the motor speed.

Figure 5:
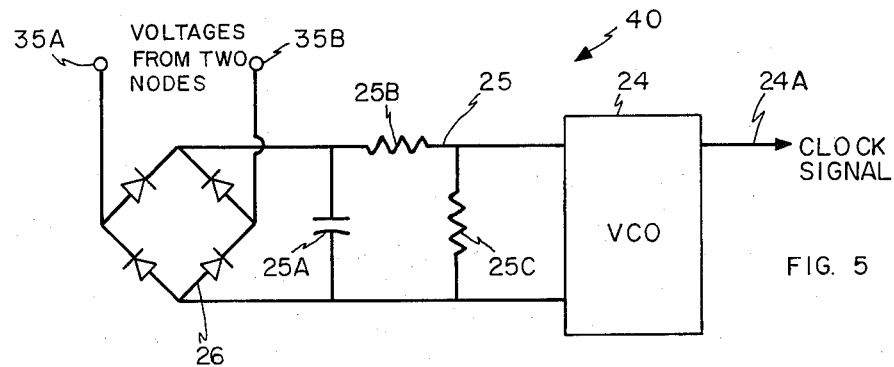
FIG. 5 is a schematic circuit diagram of a clock to provide timing signals for various elements of the electronic motor of FIG. 1.
Figure 4:
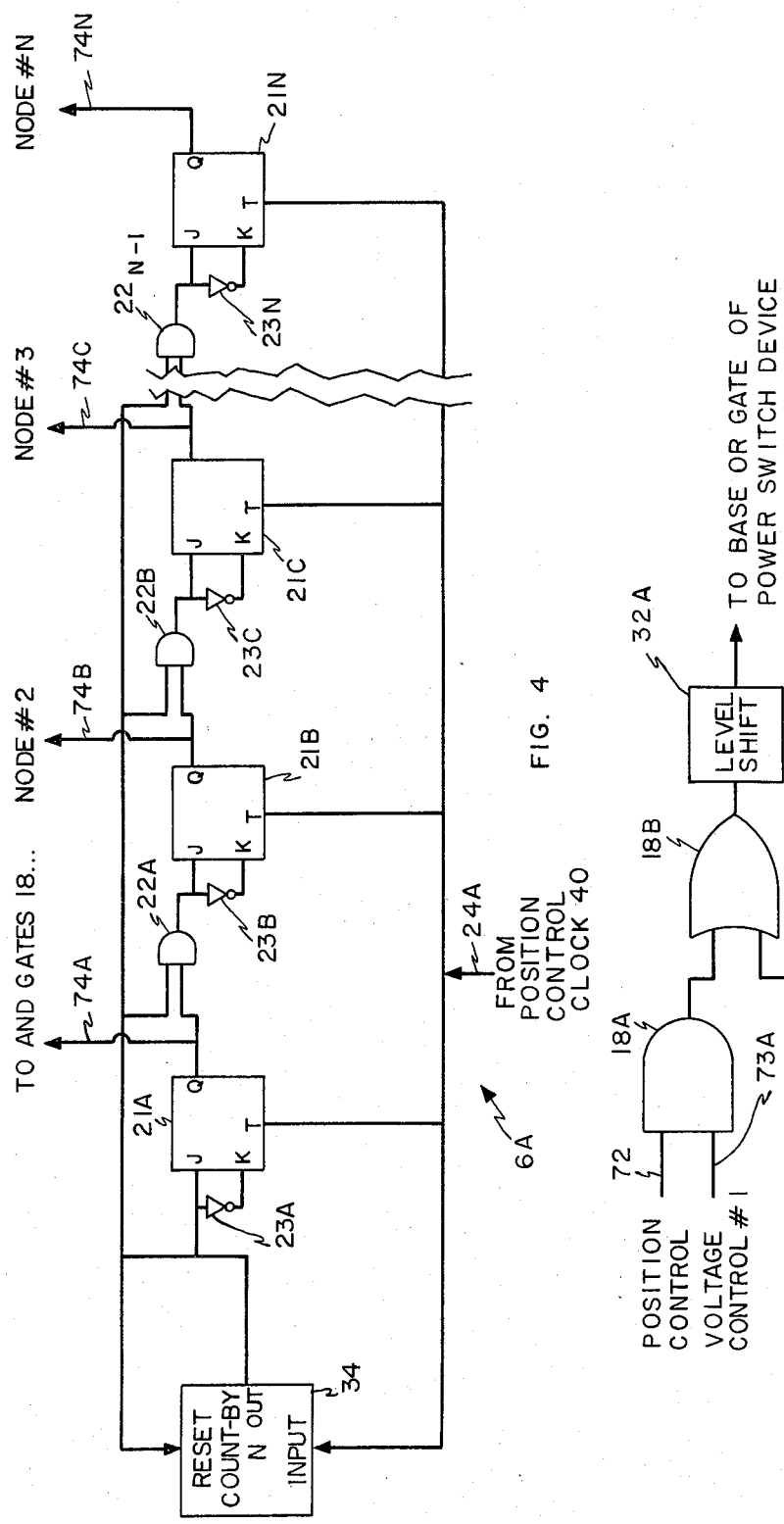
FIG. 4 is a schematic circuit diagram of a position generating shift-register.

The position signal input to the AND-gate 18, in the preferred embodiment, is from the position control module 6, and the module 6, in the preferred form, is a shift register as shown at 6A in FIG. 4 comprising flip-flops 21A . . . 21N, AND-gates 22A . . . $22_{N-1}$, and inverters 23A . . . 23N. The position generating shift register 6A operates in this way. The count-by-N module labeled 34 produces a "one" every N counts of the position control clock shown at 40 in FIGS. 1 and 5; this "one" is shifted down the position control register over N counts of the clock. Each flip-flop in the shift register 6A corresponds with one node of the motor; hence, the effect is to move the "one" around the periphery of the motor once every N counts of the clock 40.

Motor speed and voltage should be held proportional; therefore, it is convenient to control one in proportion to the other. The clock 40, in FIG. 5 comprises a rectifier bridge 26 that is connected through a low-pass filter 25 consisting of a capacitor 25A and resistors 25B and 25C to a voltage controlled oscillator 24. In this circuit the voltages applied to terminals 35A and 35B of the bridge 26 are taken from the winding nodes (the terminal 35A may be connected to the node 4A and the terminal 35B may be connected to the node 4B, for example, as indicated by arrows R and S in FIG. 1); hence, the voltage controlled oscillator 24 produces at the clock output marked 24A a basic clock frequency proportional to the voltage signal applied to the machine. This corresponds with the link 24A between the clock module 40 and the position control module 6 of FIG. 1, as well as to the input 24A to the shift register 6A in FIG. 4. The voltage signal shown in FIG. 5 as coming from two nodes through the terminal 35A and 35B may be derived from a larger number of nodes, through use of a polyphase rectifier, as is well known.

Figure 3:
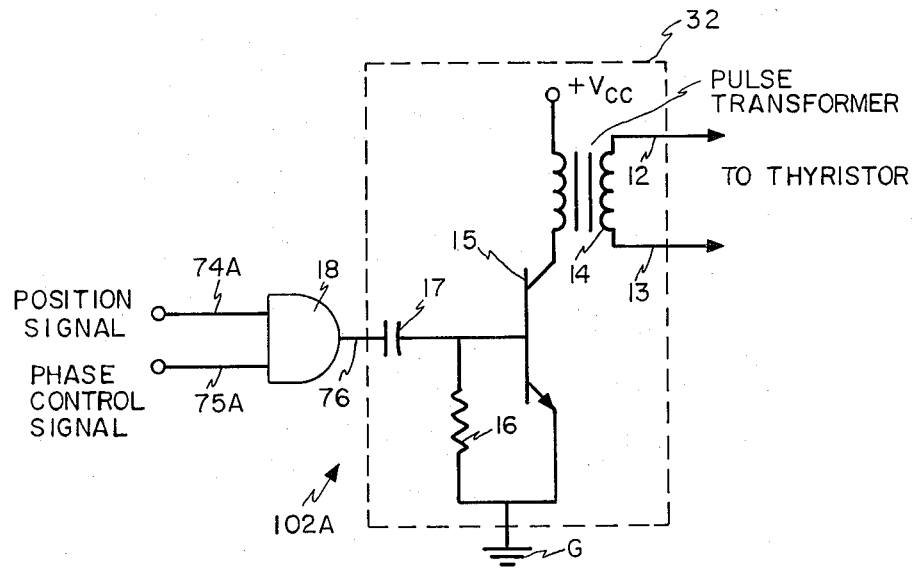
FIG. 3 is a schematic circuit diagram of a form of gating network that may be used in the master controller of FIG. 1 in conjunction with the switching network of FIG. 2.
Figure 6:
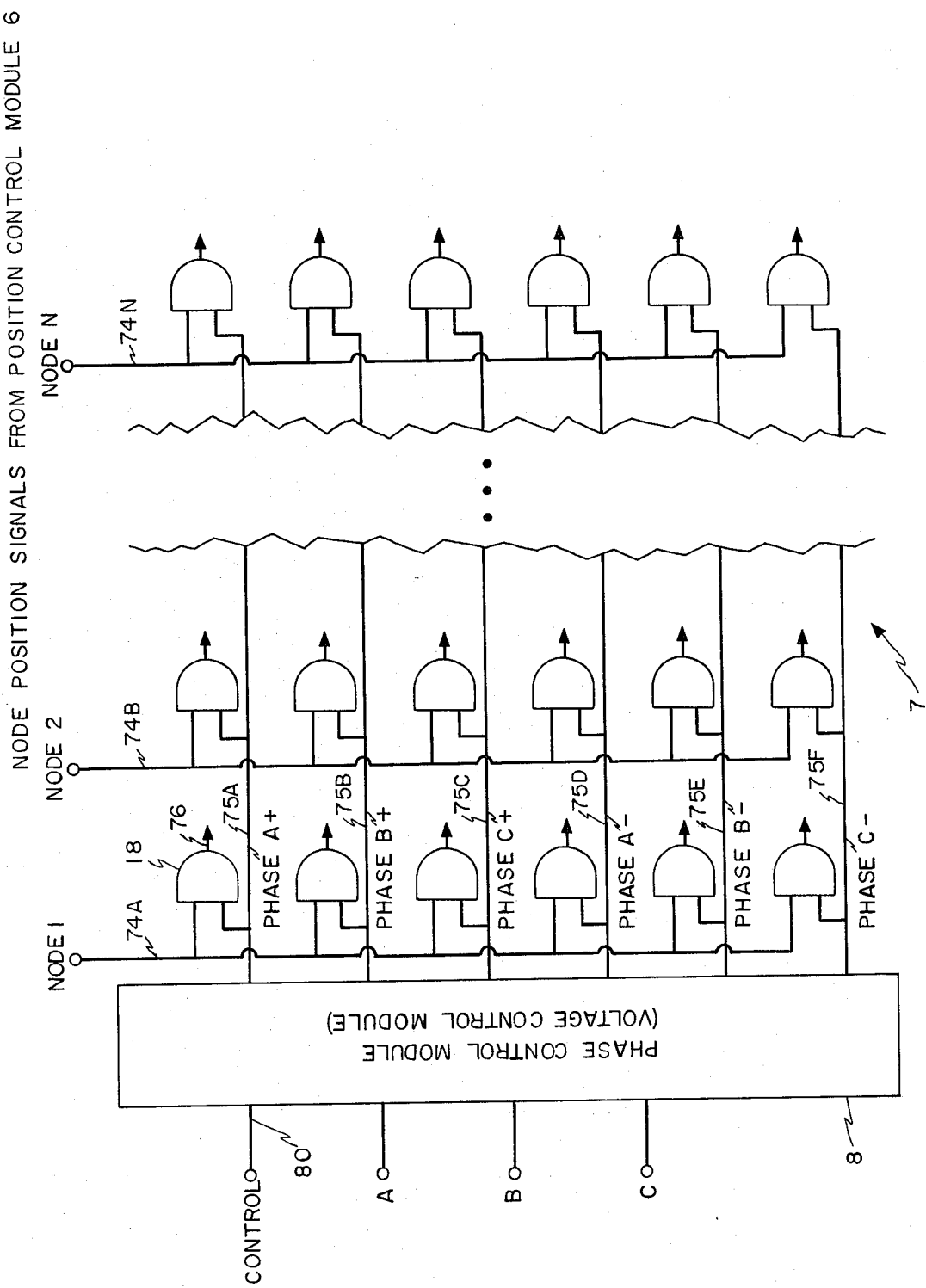
FIG. 6 is a schematic of logic circuitry in the master controller of FIG. 1.

A portion of master control module 7 is shown in FIG. 6. What is shown is the logic that mixes signals from the position control module 6 and the phase control or voltage control module 8. Mixing is accomplished by a series of AND gates which are the same as the gate 18 in FIG. 3; the output of each AND-gate is connected to a level shifter (not shown in FIG. 6) like the level shifter 32 in FIG. 3. Turning to FIG. 3, the inputs shown at 74A and 75A to the AND-gate 18 apply a position signal and a phase control signal, respectively, thereto; the input 74A is one output of the shift register 6A in FIG. 4 and the input 75A is the phase A+ output of the voltage (or phase) control module 8 in FIG. 6. (Phase A+, B+ and C+ are derived from the positive halves of the input three-phase line and phases A−, B− and C− are derived from the negative halves.) The output of the gate 18 is marked 76 in both FIGS. 3 and 6. To complete the explanation of the master control modules 7, position signals to the further AND gates shown are applied along conductors 74B–74N from the shift register 6A in FIG. 4 and phase control signals thereto are applied along conductors 75A–75F, as shown. The module 8 can be a commercially available module (e.g., Vectrol model No. VPH10109B), and manual speed control of the machine 101A can be accomplished using the normal command input shown at 80 in FIGS. 1 and 6; this normal command input may take the form of rotation of a potentiometer, a voltage level, etc., which varies the timing of the phase A+ . . . pulses and the phase A− . . . pulses connected to the circuit 7.

The electronic motor 101A works in this way. The motor is energized by closing the switch 41, thereby applying three-phase power to the system. Rotation of the rotor 1 (at speed determined by the setting of the knob 80) is accomplished, as is well known, by producing a rotating current wave in the armature winding 2. The current wave is controlled by the semiconducting switching networks 5A . . . connected to the winding nodes 4A . . . , respectively, the switching networks 5A . . . being connected between the incoming power line and the nodes, as above discussed. Rotation of the current wave is controlled by the position control module 6 in FIG. 1 (which may be 6A in FIG. 4 or some other mechanism, as later discussed). The voltage applied to the machine at the nodes 4A . . . should be proportional to rotational frequency; this is achieved by using phase control for the ac machine 101A (pulse width voltage control is used for the dc machine 101B). If the position control modulator is a shift register, the clock signal used to drive the shift register may itself be controlled by signals from the motor nodes 4A . . . , as above discussed. The phase control signal and the position control signal are mixed in the master controller or mixing module 7 which turns on each power device for a period of time proportional to the voltage required at the time when the position control module calls for it. In this way, a rotating flux wave of variable speed and fixed intensity is made to rotate within the armature of the machine 101A. It will be appreciated that the explanation in this paragraph as to the machine 101A applies, with appropriate modification, to the machine 101B.

Figure 7:
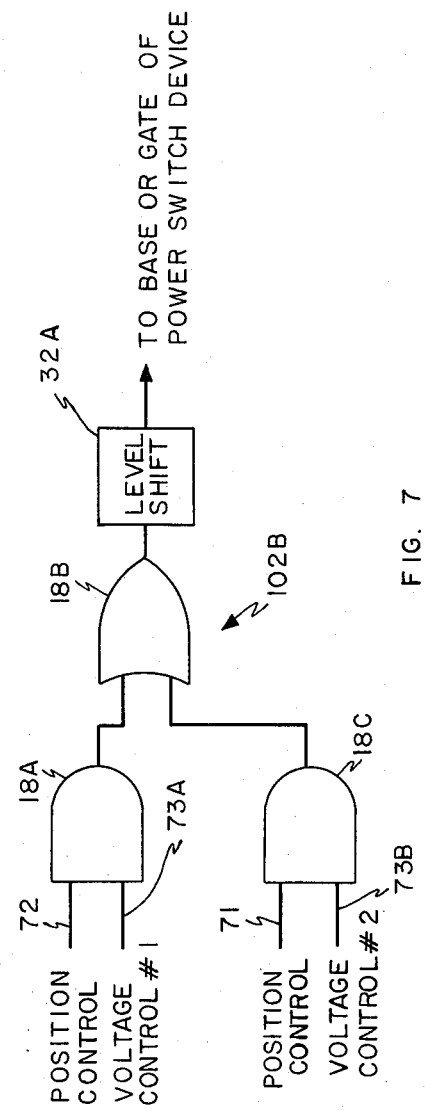
FIG. 7 is a schematic circuit diagram of a second form of gating network that may be used in the master controller of FIG. 1.

Referring now to FIG. 7, the module 102B, which may be used instead of the gating module 102A in FIG. 3, includes AND gates 18A and 18C connected to receive position control signals along conductors 72 and 71, respectively, and voltage control signals along conductors 73A and 73B, respectively. The conductor 72 is one of the conductors labeled 72A, 72B . . . in FIG. 12, as later discussed, and the conductor 71 is one of the conductors labeled 71A, 71B . . . ; the conductors 72A and 71A are used as associated inputs to a module 102B, as are, also the conductors 72B and 71B, and so forth. The other inputs to a module 102B are always the conductors 73A and 73B. (The module 102B is used to provide a two-step waveform. If a single-step waveform is to be produced then a modification of the module 102B can be employed with the single line 73 of FIG. 11A connected as input to a module consisting of gate 18A connected to the level shifter 32A, the elements 18B and 18C being eliminated.) The module 102B further includes an OR gate 18B. The OR gate 18B (which may have any number of inputs) is used to mix the several voltage and position control signals, from the gates 18A and 18C, together to get a two or more step voltage control signal. A level shifter 32A simply takes the voltage control signal from the gate 18B and makes it available to a power control element (i.e., one of the thyristors 9A₁ . . . or the transistors 28A and 28B hereinafter discussed.)

The motor 101B is essentially the same as the motor 101A, but is adapted to operate from a dc power source 103. This mandates several changes in the power control circuitry comprising transistors, but gate-turn-off switching devices would work as well. In transistor circuitry, pulse-width modulation is used for voltage control, as contrasted with phase control in thyristor circuitry. Aside from these differences, the motor 101B is the same as the motor 101A. The topology of power switching and means of determining control position are the same.

Figure 9:
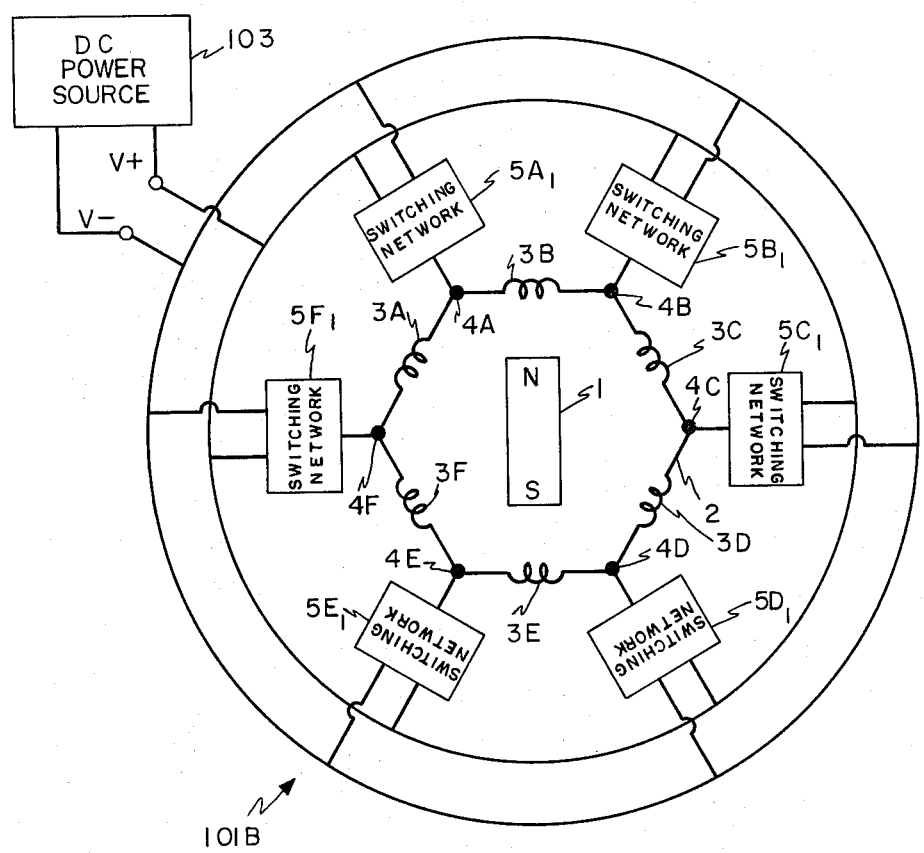
FIG. 9 is a schematic circuit diagram of a modification of the electronic motor of FIG. 1, to operate with a dc power supply.

The motor 101B is described above, but a more complete description is now given with reference first to FIG. 9, which does not include the master controller, etc., of FIG. 1, but it will be understood that these further circuit elements are needed in a functioning machine. In FIG. 9, the switching networks labeled 5A₁ . . . correspond respectively to 5A . . . but differ therefrom in that the preferred form of switching devices in the networks 5A₁ . . . is that shown in FIG. 10 which shows details of the network 5A₁.

Figure 10:
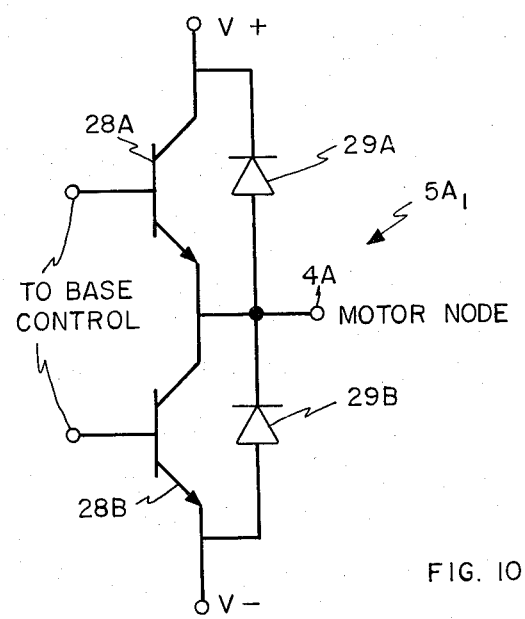
FIG. 10 is a schematic circuit diagram of a semiconductor switch using transistors and diodes to form the switching networks of FIG. 9.

The network 5A₁ in FIG. 10 is a basic switching module for use in connection with the dc system of FIG. 9. It consists of the transistors 28A and 28B to provide the basic power control while freewheeling diodes 29A and 29B provide current paths when the transistors are turned off.

Figure 11A:
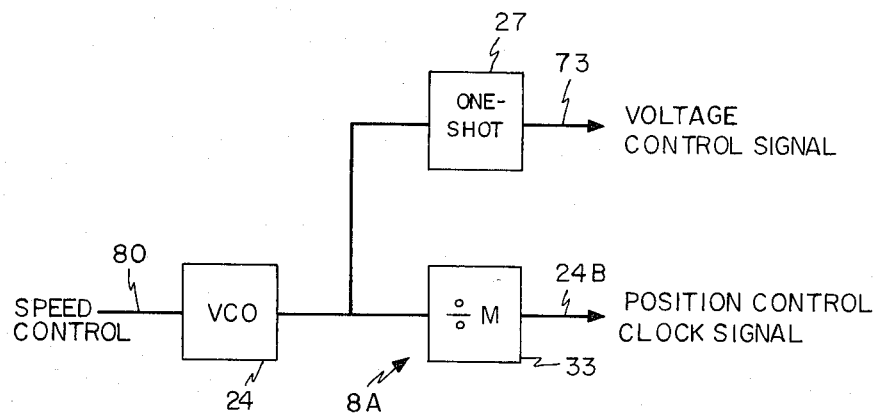
FIG. 11A is a schematic circuit diagram of a network to generate voltage command signals as shown in FIG. 8A and clock pulse signals.
Figure 11B:
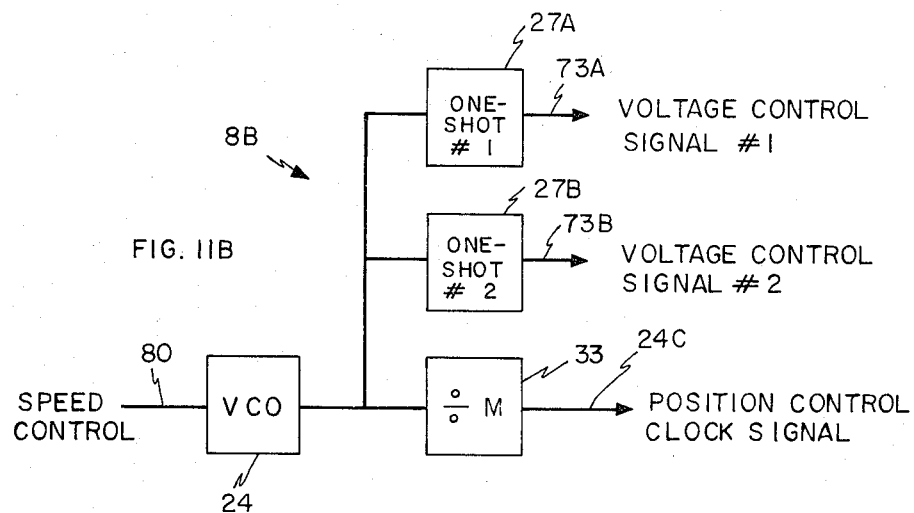
FIG. 11B is a schematic circuit diagram of a network to generate voltage command signals as shown in FIG. 8B and clock pulse signals.
Figure 12:
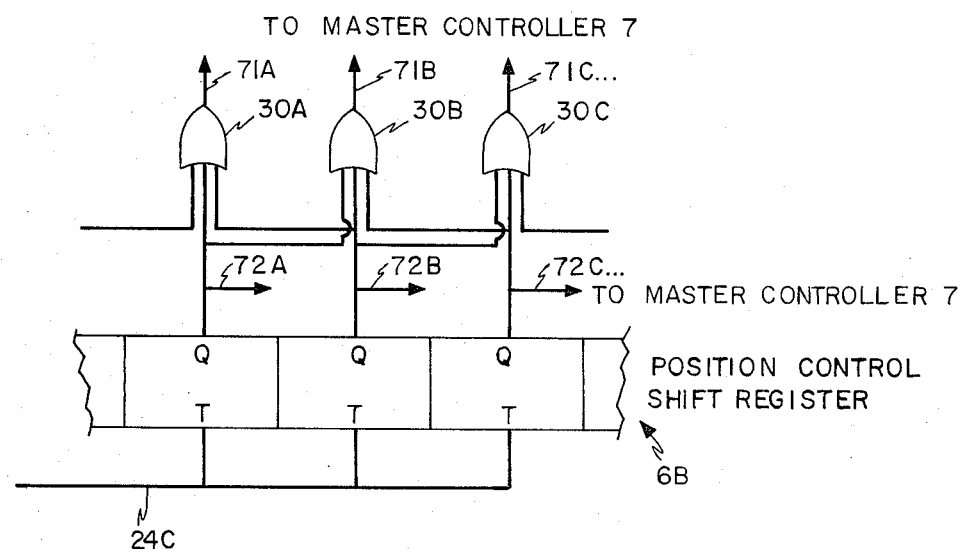
FIG. 12 is a schematic circuit diagram of a modification of the circuit of FIG. 4 to provide a two-step position control signal, to serve as inputs to the circuit of FIG. 7.

The phase control module 8 of FIG. 1 is replaced by either the voltage control module shown at 8A of FIG. 11A or the voltage control module shown at 8B of FIG. 11B when the power input is dc as in FIG. 9. Modules 8A and 8B perform the functions of both the module 8 in FIG. 1 and the clock 40, the clock outputs being marked 24B and 24C, respectively. The VCO 24 in FIGS. 11A and 11B is the same as the VCO 24 in FIG. 5, the input 80 in FIGS. 11A and 11B being, in this case, a voltage signal. The module 8A includes a one shot 27 whose output at 73 is the voltage waveform in FIG. 8A; the module 8B includes a first one shot 27A whose output at 27A is the upper waveform in FIG. 8B and a second one shot 27B whose output at 27B is the lower waveform in FIG. 8B. If the voltage control module 8B is used, the modification of the position control module shown at 6B in FIG. 12 should be used along with the gating module 102B in FIG. 7. In the operating motor 101B, the OR gates marked 30A, 30B . . . in FIG. 12 detect positions that are removed by one node from the primary position (i.e., the position of the one in the shift register of FIG. 12). It is desired to provide a voltage to the adjacent nodes that is less than the voltage provided to the primary node (i.e., the node corresponding to the position in the shift register of FIG. 12 that contains a one). This is accomplished by use of the second one-shot 27B of FIG. 11B, which produces a smaller time-average signal that the one-shot 27A (see FIG. 8B). When these are mixed in the gate 18B of FIG. 7, a two-step voltage waveform, more nearly sinusoidal and variable in average value, is applied to the motor nodes 4A-4F in FIG. 9 through the switching networks 5A₁-5F₁.

Figure 8A:
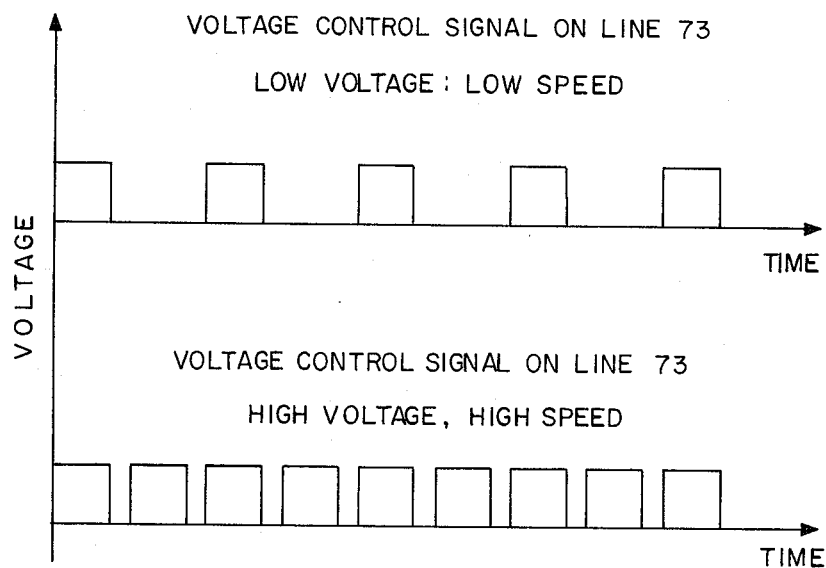
FIG. 8A is a graph showing a voltage command signal as a function of time.
Figure 8B:
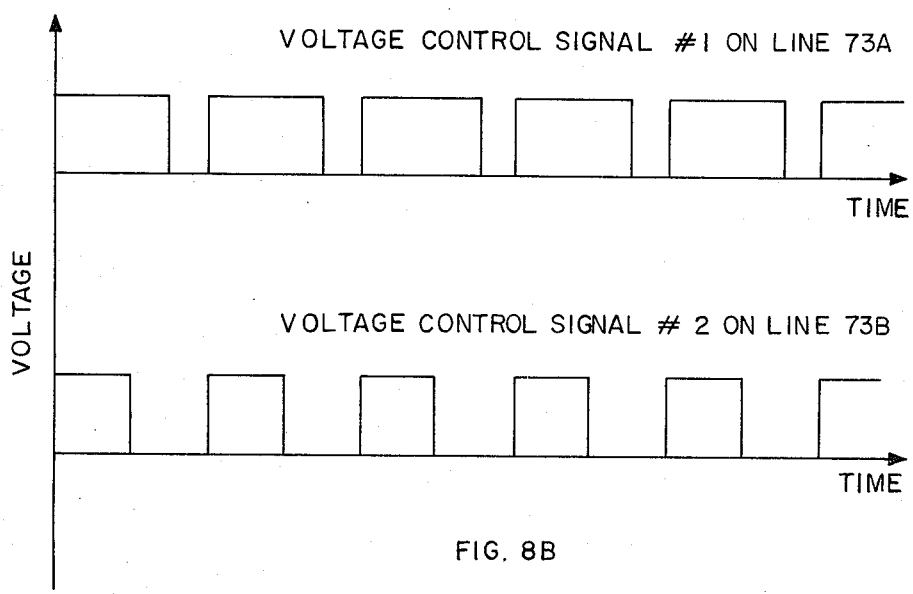
FIG. 8B is a graph showing a voltage command signal as a function of time.

The output 73 of the one-shot 27 in FIG. 11A, as above indicated, is the control waveform shown in FIG. 8A; the output 73A of the one-shot 27A in FIG. 11B is the upper control waveform in FIG. 8B and the output 73B of the one-shot 27B is the lower control waveform in FIG. 8B which together constitute a two-step voltage control signal. Both the one-step waveform of FIG. 8A and the two-step waveform of FIG. 8B have variable average values to control speed of the motor 101B.

A few comments of a general nature are made in this and the next two paragraphs. In all the systems discussed herein, there are two fundamental control signals: the command to the position control module 6, for example, which is referred to here as the "clock", and the phase control signal or the voltage control signal which is input to the phase control or pulse width control modules 102A and 102B. These signals must be coordinated, in order to produce a rotating flux wave of constant amplitude. This coordination may be performed in one of several ways. In the preferred embodiment described above with reference to FIG. 1, the command signal 80 that is input to the drive is a signal to the voltage control module 8. The action of the voltage control module 8 plus the gating networks 102A and switching modules 5A . . . is to apply a variable voltage to the motor nodes 4A . . . . A variable frequency clock signal is derived by the network shown in FIG. 5. The clock circuitry of FIG. 5 receives the voltage applied to the nodes 4A . . . , the node voltage being rectified by the bridge 26, smoothed by the filter 25 and applied to the voltage controlled oscillator 24. The clock signal is, hence, proportional to the voltage applied to the motor winding 2. (Of course, the bridge 26 may have a polyphase, rather than signal phase input, to avoid problems of signal nonuniformity at low speeds.) In the dc system of FIG. 9, primary control is through the voltage input to a voltage controlled oscillator, i.e., the voltage controlled oscillator 24. Voltage control signals and the position controlling clock signal are both derived from the same pulse train, as shown in FIGS. 11A and 11B.

Further possibilities exist. For example, primary system control could be the position control clock frequency, with the voltage control signal being derived from shaft speed through a tachometer or pulse encoder; or the position control module could be controlled by a shaft position detector which would yield a torque-speed relationship somewhat different from that of other schemes.

Further modifications of the invention herein disclosed will occur to persons skilled in the art and all such modifications are deemed to be within the spirit and scope of the invention as defined by the appended claims.

What is claimed is:

1. A variable speed electronic motor for connection to a power source that comprises, in combination: a rotor; an armature winding; semiconductor switching means to connect between the power source and the armature winding, the semiconductor switching means comprising semiconductor switches connected in pairs in which one semiconductor switch of each pair is operable to carry current to the winding and the other semiconductor switch of each pair is operable to carry current from the winding; position control module means to provide a position control signal; voltage control module means to provide a voltage control signal; and control means connected to control the semiconductor switching means, said control means comprising an electrical gating module connected to control each semiconductor switch of each pair, each gating module including a logic gate and signal transfer means connected to transfer control information to the associated semiconductor switch from the logic gate, the logic gate being connected to receive the position control signal and the voltage control signal and being operable to combine the two signals to form a composite signal output that is fed as a control signal to said associated semiconductor switch to control the speed of the motor and the amount of electric energy transferred thereto said logic gate being a gate that provides said composite signal output only when both the position control signal and the voltage control signal are present as inputs to the logic gate.

2. An electronic motor as claimed in claim 1 wherein the winding comprises a plurality of coils wound in a polygon configuration with a winding node between each two coils of the winding and wherein a pair of semiconductor switches of the semiconductor switching means is provided to connect between the power source and each node.

3. An electronic motor as claimed in claim 2 in which the control means has a logic gate connected to control electric current flow to each winding node, in which the position control module means comprises a shift register having as many flip-flops as the armature winding has nodes, one flip-flop output at any point in time being a logical "1" and the rest being logical "0s", the position of the logical "1" being made to shift one position for each pulse of a clock signal, each flip-flop being connected to provide a position control signal in the form of a logical "1" to a winding node through the logic gate associated with that particular node, and clock means connected to introduce clock pulses to the shift register.

4. An electronic motor as claimed in claim 3 in which the voltage control means is operable to produce a pulse-like signal consisting of two levels, a logical "1" and logical "0", the relative duration of these two levels determining the average voltage and, hence, the electric energy transfer to the motor.

5. An electronic motor as claimed in claim 4 in which the voltage control module means is a multivibrator and in which the clock signal is connected to trigger the multivibrator into its mestastable state.

6. An electronic motor as claimed in claim 5 in which the signal transfer means comprises voltage level shifting means.

7. An electronic motor as claimed in claim 5 wherein the electronic signal transfer means comprises pulse transformer means.

8. An electronic motor as claimed in claim 5 in which the signal transfer means comprises a photodiode and in which the semiconductor switching means comprises phototransistors positioned to receive control signals from an associated photodiode.

9. An electronic motor as claimed in claim 5 in which the semiconductor switching means comprises transistors connected in parallel with diodes, each diode being connected to conduct electric current in the opposite direction from the transistor with which it is connected.

10. An electronic motor as claimed in claim 5 wherein the semiconductor switching means comprises thyristors connected in a bridge configuration.

11. A electronic motor as claimed in claim 5 in which the clock means is a voltage controlled oscillator and in which the voltage signal is used to control the voltage controlled oscillator is derived by rectification of the voltages at the nodes of the armature winding.

12. An electronic motor as claimed in claim 1 in which the winding comprises a plurality of coils connected in a polygon configuration and in which the motor is adapted to receive a polyphase ac input.

13. An electronic motor as claimed in claim 1 in which the winding comprises a plurality of coils connected in a polygon configuration and in which the motor is adapted to receive a dc input.

14. An electronic motor as claimed in claim 1 in which the winding comprises a plurality of coils connected in a polygon configuration and in which the motor is adapted to receive a single-phase ac input.

15. An electronic motor as claimed in claim 1 in which the logic gate is an AND-gate connected to combine said two signals.

16. A variable speed electronic motor as claimed in claim 1 in which the logic gate is an AND-gate that controls switching of the semiconductor switch associated therewith.

17. A variable speed electronic motor as claimed in claim 1 in which the logic gate is a NOR-gate.

18. A variable speed electronic motor as claimed in claim 1 in which the signal transfer means is a level shifter connected to receive said composite signal output and adapted to increase the voltage level thereof to a value appropriate for said associated semiconductor switch.

19. A variable speed electronic motor as claimed in claim 1 wherein the logic gate is a NAND-gate.

20. A variable speed electronic motor for connection to a power source that comprises, in combination: a rotor; an armature winding; semiconductor switching means for connection between the power source and the armature winding, the semiconductor switching means comprising semiconductor switches connected in pairs in which one semiconductor switch of each pair is operable to carry current to the winding and the other semiconductor switch of each pair is operable to carry current from the winding; position control module means to provide a position control signal; voltage control module means to provide a voltage control signal; and control means connected to control the semiconductor switching means, said control means comprising an electrically operated gating module connected to control each semiconductor switch of each pair and including logic gate means connected to transfer control information to the associated semiconductor switch, said logic gate means being connected to receive the position control signal and the voltage control signal and being operable to combine the two signals to form a composite signal output that is fed as a control signal to said associated semiconductor switch to control the speed of the motor and the amount of electric energy transferred thereto, said logic gate means being operable to provide said composite signal output only when both the position control signal and the voltage control signal are present as inputs to the logic gate means.

21. A variable speed electronic motor as claimed in claim 20 wherein said logic gate means is an AND-gate, there being, thus, a plurality of gating modules in the control means, each gating module being connected to control one semiconductor switch, which control is effected by the AND-gate in the particular gating module.

22. A variable speed electronic motor as claimed in claim 21 wherein each gating module comprises a plurality of AND-gates to effect control of the semiconductor switch associated therewith.

23. A variable speed electronic motor as claimed in claim 22 wherein each gating module further includes an OR-gate connected to combine the outputs of the plurality of AND-gates.

* * * * *